United States Patent
Schmitt

(10) Patent No.: US 9,783,146 B2
(45) Date of Patent: Oct. 10, 2017

(54) ROLLOVER PROTECTION SYSTEM FOR A MOTOR VEHICLE

(71) Applicant: Dr. Ing. h.c. F. Porsche Aktiengesellschaft, Stuttgart (DE)

(72) Inventor: Hans-Juergen Schmitt, Muehlacker (DE)

(73) Assignee: DR. ING H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/151,533

(22) Filed: May 11, 2016

(65) Prior Publication Data
US 2016/0368446 A1    Dec. 22, 2016

(30) Foreign Application Priority Data
Jun. 19, 2015   (DE) .......................... 10 2015 109 859

(51) Int. Cl.
B60R 21/13   (2006.01)

(52) U.S. Cl.
CPC ........ B60R 21/13 (2013.01); *B60R 2021/135* (2013.01)

(58) Field of Classification Search
CPC ........... B60R 21/13; B60R 2021/0435; B60R 2021/134; B60R 2021/343; B60R 21/04; B60R 2021/0018
USPC ... 296/180.1, 122, 85, 187.13, 205, 102, 30; 280/756, 729, 730.1; 180/274, 282, 89.12
See application file for complete search history.

(56) References Cited

U.S. PATENT DOCUMENTS

| | | | |
|---|---|---|---|
| 7,416,214 B2* | 8/2008 | Hermann | B60R 21/13 280/756 |
| 8,820,824 B1* | 9/2014 | Hinz | B62D 25/06 296/187.13 |
| 2005/0082808 A1* | 4/2005 | Wildig | B60R 21/13 280/756 |
| 2006/0097499 A1* | 5/2006 | Welch | B60R 21/13 280/756 |

FOREIGN PATENT DOCUMENTS

| | | |
|---|---|---|
| DE | 42 00 522 | 7/1993 |
| DE | 10 2009 025 446 | 12/2010 |
| EP | 0431203 A1 | 6/1991 |
| GB | 2471004 A | 12/2010 |

OTHER PUBLICATIONS

German Search Report of Apr. 11, 2016.

\* cited by examiner

*Primary Examiner* — Glenn Dayoan
*Assistant Examiner* — Sunsurraye Westbrook
(74) *Attorney, Agent, or Firm* — Gerald E. Hespos; Michael J. Porco; Matthew T. Hespos

(57) ABSTRACT

A rollover protection system for a motor vehicle has a profiled strut (3) extending in the direction of a vertical axis (6) of the vehicle, and a deformation element (4) held at a first end (9) of the profiled strut (3). The first end (9) is formed facing away from a vehicle floor of the motor vehicle, and the deformation element (4) has a first outer surface (10) facing away from the profiled strut (3) to form an impact surface. The deformation element (4) has a breaking element (11) in the form of a cutting roller.

7 Claims, 4 Drawing Sheets

ROLLOVER PROTECTION SYSTEM FOR A MOTOR VEHICLE

CROSS REFERENCE TO RELATED APPLICATION

This application claims priority under 35 USC 119 to German Patent Appl. No. 10 2015 109 859.8 filed on Jun. 19, 2015, the entire disclosure of which is incorporated herein by reference.

BACKGROUND

1. Field of the Invention

The invention relates to a rollover protection system for a motor vehicle.

2. Description of the Related Art

Rollover protection systems for motor vehicles are known. The rollover protection systems customarily are accommodated more or less invisibly in a body of the motor vehicle during normal operation of the motor vehicle and are extended from the body only in the event of a corresponding situation differing from the normal operation of the motor vehicle, for example a crash situation. Some rollover protection systems have deformation crossbars with a deformation element to retain a distance of a vehicle inner surface from an impact surface.

The deformation element functions to absorb an impulse force and is provided for enlarging the profiled strut and for removing the load on a latching device. The impulse force is intended to be able to be absorbed as completely as possible by the deformation element so that the latching device is removed of load. To achieve the full extension height, a body component, such as a glass window, has to be destroyed in a targeted and controlled manner. The deformation element has a breaking element to achieve the controlled destruction. The breaking element customarily is designed in the form of a spike.

It is an object of the invention to provide a further developed rollover protection system for a motor vehicle.

SUMMARY

The invention relates to a rollover protection system for a motor vehicle. The rollover protection system has a deformation crossbar that comprises a profiled strut extending in the direction of a vertical axis of the motor vehicle, and a deformation element accommodated at a first end of the profiled strut. The first end faces away from a vehicle floor of the vehicle. The deformation element has a first outer surface that faces away from the profiled strut to define an impact surface, and further has a breaking element in the form of a cutting roller. The cutting roller has greater rigidity than the breaking element of the prior art, and can have a simpler connection to the rollover protection.

A breaking element in the form of a cutting roller can be attached at different regions to the deformation element. In comparison to a spike- or pin-shaped breaking element, the optimum impact effect of which is obtained at the virtually point-shaped tip thereof, the impact effect of the breaking element designed as a cutting roller can be brought about over a circular section, and therefore virtually linearly. It is therefore not necessary to attach the breaking element to the first outer surface; rather, the breaking element also can be attached, for example, to an end side of the deformation element and ideally can be supported downward in an optimally rigid manner.

A disk-shaped breaking element affords the advantage of forming a small breaking element that can be accommodated on the deformation crossbar in a largely concealed manner and requiring little space.

The breaking element may have a sharp cutting or breaking edge for reliable destruction of the body component in a simple manner. For example, the breaking element may be in the form of a cone and may have first element surface with a smaller diameter than a second element surface of the breaking element. The second element surface may face away from the first element surface. The smaller first element surface may be arranged facing the deformation element. Thus, an excess length beyond the deformation element can be obtained in a simple manner and a virtually perpendicular arrangement to the window can be obtained.

The breaking element may be held on the deformation element with the aid of a frictional and/or interlocking connection to provide a simple connection in comparison to the complicated adhesive bonding of the breaking element known from the prior art spike- or pin-shaped breaking element. The connection can be realized, for example, with the aid of a screw, a bolt or a rivet.

The breaking element may be held on a surface of the deformation element that is at the smallest distance from a body component which can be destroyed in a controlled manner with the aid of the breaking element. Thus, the body component is destroyed before the deformation crossbar comes into contact with the body component.

The breaking element may be produced from hard metal, possibly even hardened steel.

In principle, every body shape has individual stability. Thus, for example, a convertible can be designed differently in terms of the stability behavior thereof than, for example, a saloon. Also, for example, a "notchback body" has different stability behavior than a "coupe" or a "station wagon." Therefore, with individual adaptation of the deformation element to the internal contour of the motor vehicle, i.e. simulation of a corresponding inner surface of the motor vehicle, the individual stability behavior of the motor vehicle body is supported in a controlled manner. A breaking element designed as a cutting roller has a cutting or breaking edge that can be predominantly concealable with respect to a deformation element adapted to the internal contour of the motor vehicle.

Further features, advantages and details of the invention emerge from the description below of preferred exemplary embodiments and with reference to the drawing. The features and combinations of features mentioned above in the description and the features and combinations of features mentioned below in the description of the figures and/or only shown in the figures can be used not only in the respectively stated combination, but also in different combinations or on their own without departing from the scope of the invention. Identical or functionally identical elements are assigned identical reference numbers. For clarity reasons, it is possible that the elements are not provided with the reference numbers thereof in all of the figures, but without the assignment thereof being lost.

DETAILED DESCRIPTION

Figure 1:
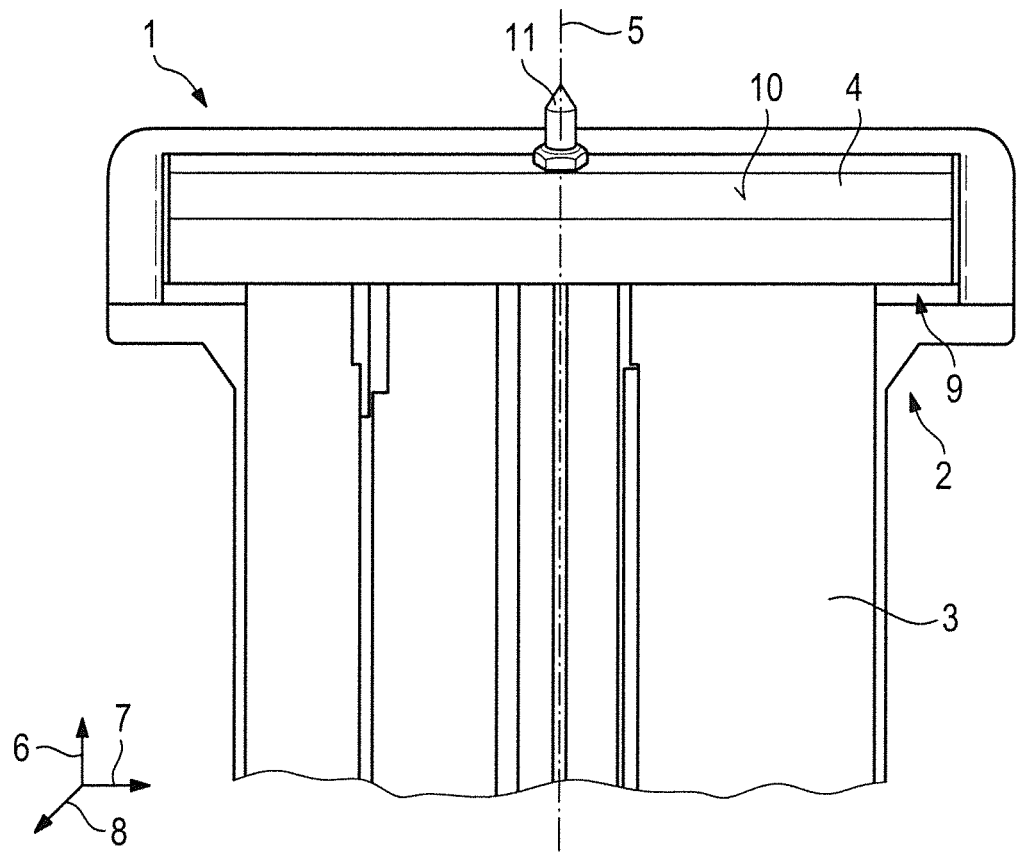
FIG. 1 is a rear view of a deformation crossbar of a rollover protection systems according to the prior art.

A prior art rollover protection system 1 for a motor vehicle is designed in accordance with FIG. 1. The rollover protection system 1 has a deformation crossbar 2 that comprises a profiled strut 3 and a deformation element 4 fixedly connected to the profiled strut 3. The profiled strut 3 has a longitudinal axis 5 that corresponds in the direction of extension thereof approximately to a vertical axis 6 of the motor vehicle.

For improved explanation, the vertical axis 6 of the vehicle, a transverse axis 7 of the vehicle that is normal to the vertical axis 6 of the vehicle, and a longitudinal axis 8 of the vehicle that is normal to both the vertical axis 6 and the transverse axis 7 of the vehicle, are illustrated symbolically in the form of a Cartesian coordinate system symbol.

The deformation element 4 is arranged at a first end 9 of the profiled strut 3, where the first end 9 faces away from a body floor surface (not illustrated specifically) of the motor vehicle. The deformation element 4 is produced, for example, as an extruded profile and has a breaking element 11 in the form of a spike produced from hard metal on a first outer surface 10 facing away from the profiled strut 3. The spike is connected to the deformation element 4 in an integrally bonded manner and, for secure fastening, has a holding element in the form of a threaded sleeve.

Figure 2:
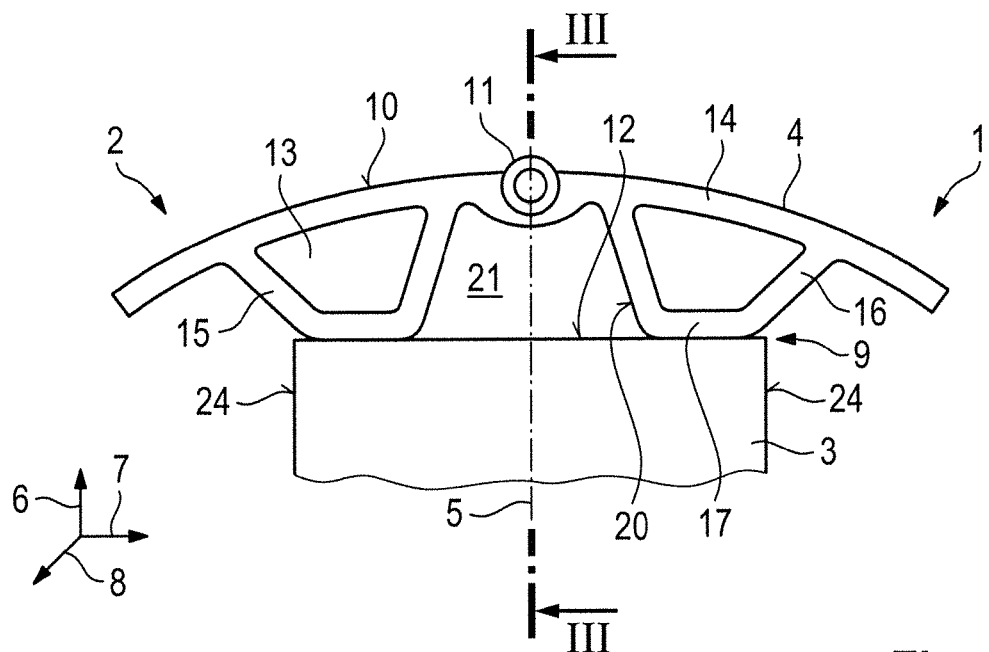
FIG. 2 is a rear view of a deformation crossbar of a rollover protection system according to a first exemplary embodiment of the invention.
Figure 3:
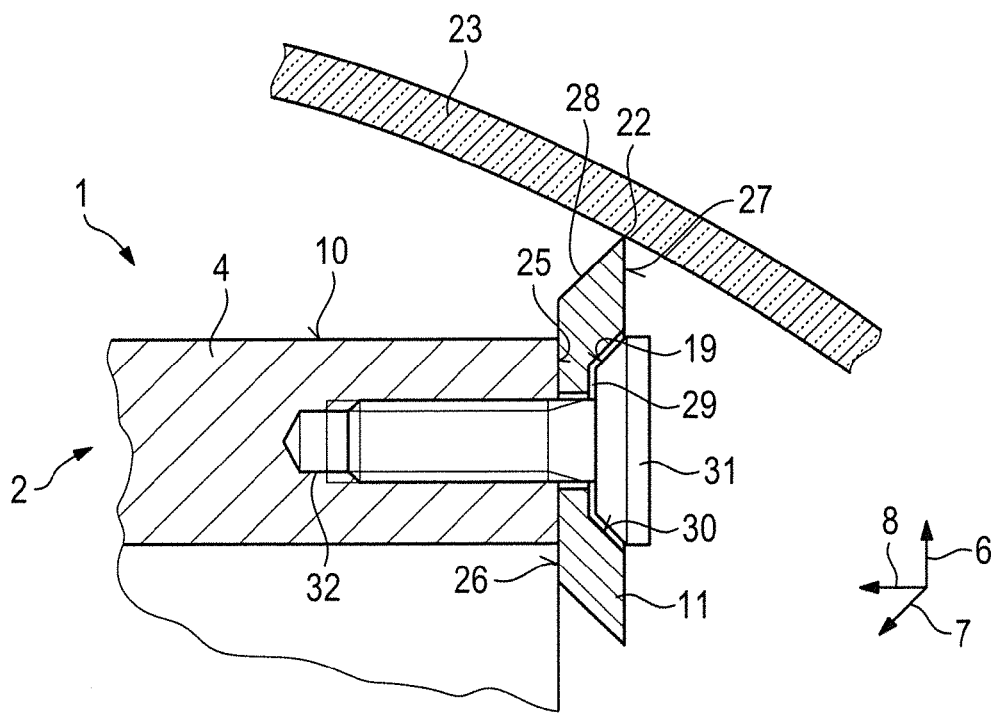
FIG. 3 is a cross-section along the line III-III of FIG. 2.

A first exemplary embodiment of a rollover protection system 1 according to the invention is illustrated in FIGS. 2 and 3. The deformation element 4 is designed in the form of a strut profile extending in the direction of the longitudinal axis 8 of the vehicle. The deformation element can be produced, for example, as an extruded component with the profile cross section extending in the direction of the transverse axis 7 of the vehicle. The result, therefore, is cost-effective production with simultaneous use of a light metal component if the deformation element 4 is produced, for example, from aluminum.

The profiled strut 3 has a contact surface 12 facing the deformation element 4 and on which the deformation element 4 is held.

The first outer surface 10 faces away from the contact surface 12 and functions as an impact surface. The outer surface advantageously is adapted to an internal contour (not illustrated specifically) of the motor vehicle or formed in a complementary manner with respect to said internal contour.

The deformation element 4 has a honeycomb-like design in the form of a hollow body and has chambers 13. In the first exemplary embodiment, the chambers 13 are arranged symmetrically with respect to the longitudinal axis 5. However, this is not necessary. The chambers could likewise be arranged asymmetrically with respect to the longitudinal axis 5, depending on the type of cassette.

The chambers 13 are delimited from the surroundings by a first outer wall 14, a second outer wall 15, a third outer wall 16 and a fourth outer wall 17. The first outer wall 14 has the first outer surface 10 that faces away from the chambers 13. The second outer wall 15 and the third outer wall 16 delimit the deformation element 4 in the direction of the transverse axis 7 of the vehicle. The fourth outer wall 17 faces away from the first outer wall 14 and connects to the profiled strut 3.

The first outer surface 10 protruding over the contact surface 12 in the direction of the transverse axis 7 of the vehicle. In other words, the extent of the first outer wall 14 in the direction of the transverse axis 7 of the vehicle is greater than the extent of the contact surface 12. In this exemplary embodiment, the profiled strut 3 protrudes symmetrically over on the two side walls 24 thereof by the first outer wall 14 and therefore also by the first outer surface 10. An asymmetrical or one-sided protrusion could also be formed depending on the internal contour of the motor vehicle.

The fourth outer wall 17 has a second outer surface 20 facing the contact surface 12 and can be connected to the contact surface 12 in an integrally bonded manner in sections with the aid of a weld seam. A further chamber 21 is formed between the second outer surface 20 and the contact surface 12.

The breaking element 11 is held on the deformation element 4 and is positioned on a first end side 25 of the deformation element 4 in the vicinity of the first outer surface 10. The breaking element 11 is designed in the form of a cutting roller. In this exemplary embodiment, the breaking element 11 has the form of a conical or frustoconical disk. However, breaking element could be designed in the shape of a pointed roof. The first end side 25 of the deformation element 11 is distinguished in relation to a second end side (not illustrated specifically) by the fact that the first end side 25 has the smallest distance from a body component 23, in general a vehicle window, to be destroyed in a controlled manner with the aid of the breaking element 11.

An edge 22 of the breaking element 11 facing the body component 23 preferably defines a sharp-edge so that the body component 23 is destroyed in a controlled manner owing to contact of the breaking element 11 with the body component 23 during an impact action.

The breaking element 11 has a first element surface 26 and a second element surface 27 that are connected to each other via a circumferential surface 28. The first element surface 26 has a smaller diameter than the second element surface 27 to define the conical or frustoconical shape. The first element surface 26 is positioned to face and contact manner the end side 25.

In this example, the breaking element 11 is held on the deformation element 4 by a detachable connection, as shown in FIG. 3. The releasable connection in this embodiment is designed as a screw connection. The breaking element 11 has an interior bore 29 with a counterbore 30 adapted to an external contour 19 of the connecting means 31 used for producing the connection. In this embodiment, the connecting means 31 is a screw. The counterbore 30 is preferably formed in a complementary manner with respect to the external contour 19. The screw 31 is held in a bore 32 in the deformation element 4.

The breaking element 11 preferably is produced from hard metal and is arranged in the vicinity of a position of the deformation element 4 closest to the rear windows, as viewed from the contact surface 12. In these embodiments, this highest point with respect to the expansion of the deformation element 4 in the direction of the transverse axis 7 of the vehicle is formed centrally on the longitudinal axis 5 of the profiled strut 3.

Figure 4:
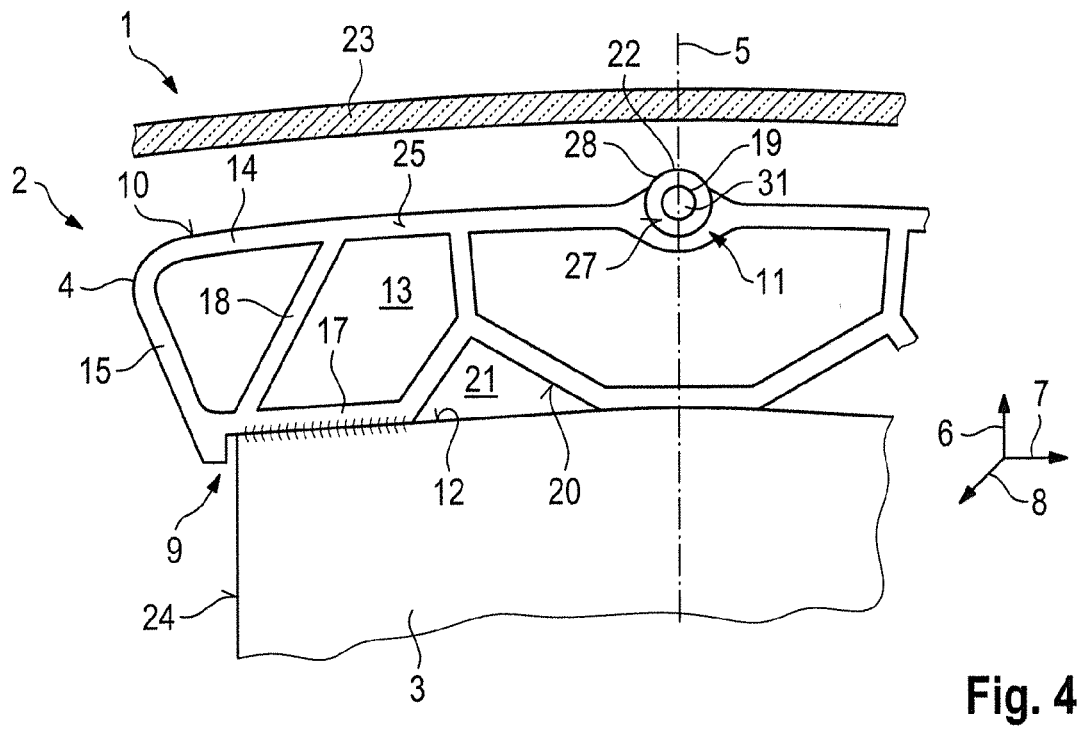
FIG. 4 is a rear view of a detail of the deformation crossbar of the rollover protection system according to a second exemplary embodiment of the invention.
Figure 5:
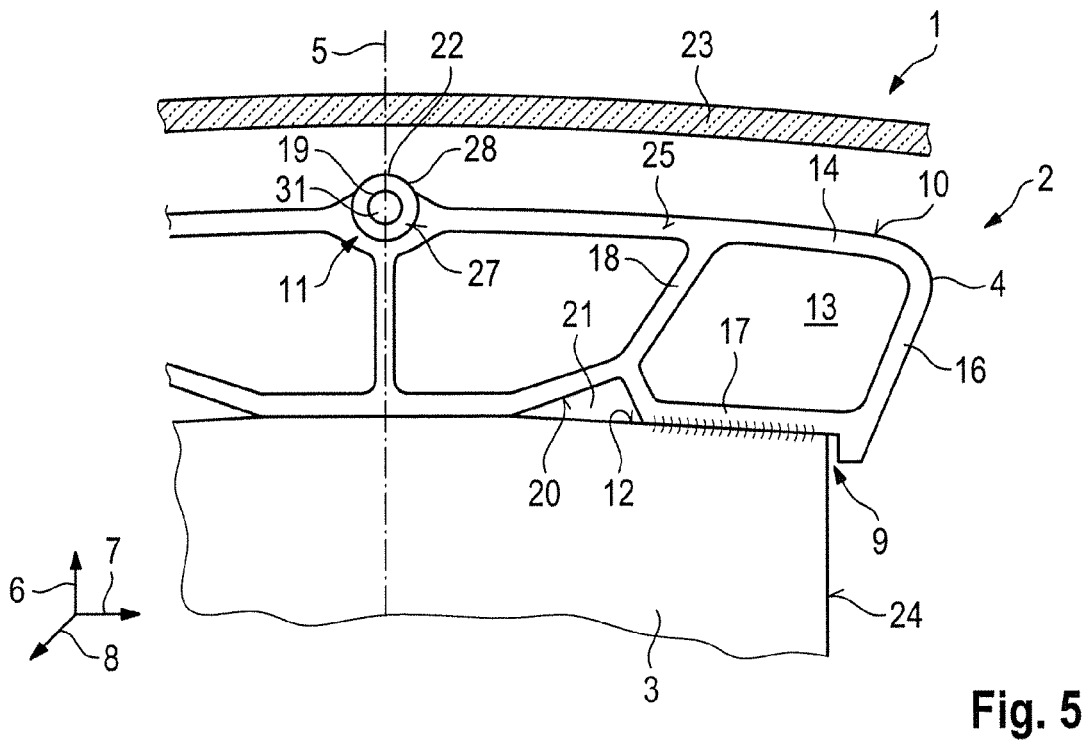
FIG. 5 is a rear view of a detail of the deformation crossbar of the rollover protection system according to a third exemplary embodiment of the invention.
Figure 6:
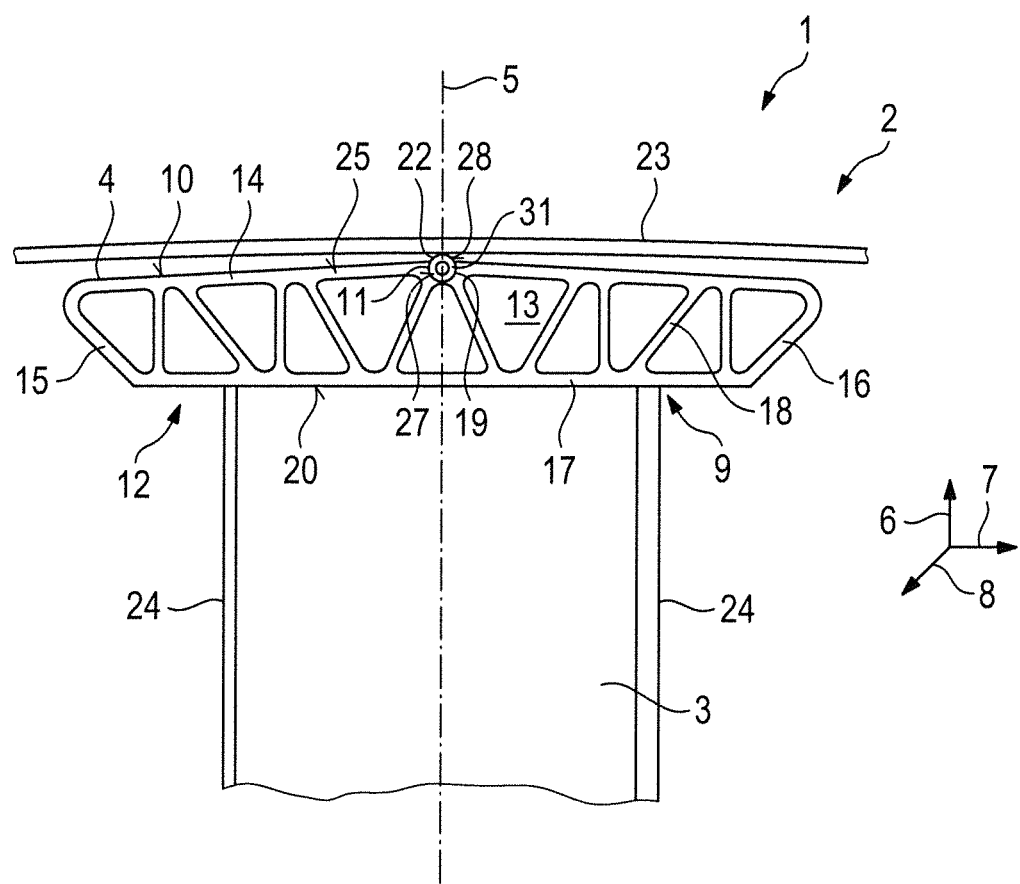
FIG. 6 is a rear view of a detail of the deformation crossbar of the rollover protection system according to a fourth exemplary embodiment of the invention.

FIGS. 4 to 6 show further embodiments of a rollover protection system 1 according to the invention, wherein the deformation crossbar 2 differs in design.

The deformation element 4 in the form of a strut profile having five chambers 13 is shown in the embodiment of FIG. 4. In comparison, the strut profile of the deformation element 4 of the third exemplary embodiment of FIG. 5, has four chambers 13. The fourth exemplary embodiment is illustrated in FIG. 6 and has the deformation crossbar 2 with a deformation element 4 having eleven chambers 13. In the further exemplary embodiments illustrated, as also in the first exemplary embodiment, the breaking element 11 is arranged on an axis of symmetry of the deformation crossbar 2.

The chambers 13 of the second, third and fourth exemplary embodiment are separated from one another with the aid of walls 18 of the deformation element 4. Some of the walls 18 are inclined in relation to the longitudinal axis 5. The second outer wall 15 and the third outer wall 16 are inclined outward in relation to the fourth outer wall 17. The first outer wall 14 extends longer in the direction of the transverse axis 7 of the vehicle than the fourth outer wall 17. The inclination of the second outer wall 15 and of the third outer wall 16 preferably is adapted to the internal contour of the motor vehicle.

FIGS. 5 and 6 show a support of the breaking element by means of vertical or V-shaped ribs, as a result of which the effect is optimized. The use of the breaking element is also possible in the case of a plate-like or open design of the profiled strut.

The chambers 13 of the deformation element 4 are open in the direction of the longitudinal axis 8 of the vehicle in relation to the surroundings, so that improved deformation or expansion during absorption of the impulse force is possible.

What is claimed is:

1. A rollover protection system for a motor vehicle, comprising:
    a profiled strut extending in a direction of a vertical axis of the vehicle;
    a deformation element held at an end of the profiled strut facing away from a vehicle floor of the motor vehicle, the deformation element having a first outer surface facing away from the profiled strut and defining an impact surface; and
    a breaking element attached to the deformation element, the breaking element being a disk-shaped cutting roller of frustoconical shape with a first element surface defining a smaller diameter and a second element surface facing away from the first element surface and defining a larger diameter than the first element surface, the first element surface facing the deformation element, the breaking element further having frustoconical circumferential surface extending between the first element surface and the second element surface and projecting in the direction of the vertical axis of the vehicle farther than the first outer surface.

2. The rollover protection system of claim 1, wherein the breaking element is held on the deformation element by a friction and/or interlocking connection.

3. The rollover protection system of claim 1, wherein the breaking element is held on a surface of the deformation element that is at the smallest distance from a body component that can be destroyed in a controlled manner with the aid of the breaking element.

4. The rollover protection system of claim 1, wherein the breaking element is produced either from hard metal or from a hardened steel.

5. The rollover protection system of claim 1, wherein the first and second element surfaces are aligned substantially in the direction of the vertical axis of the vehicle.

6. The rollover protection system of claim 1, wherein the second element surface and the circumferential surface of the breaking element meet at an edge that projects farther in the direction of the vertical axis of the vehicle than any other part of the breaking element.

7. The rollover protection system of claim 6, wherein the second element surface and the circumferential surface of the breaking element meet at an acute angle.

* * * * *